United States Patent [19]

Ueng

[11] Patent Number: 4,802,751
[45] Date of Patent: Feb. 7, 1989

[54] MIRROR ASSEMBLIES WITH UNIVERSAL JOINTS

[76] Inventor: Ming-Shean Ueng, 1856 Sherman St., Apt. 4, Hollywood, Fla. 33020

[21] Appl. No.: 93,175

[22] Filed: Sep. 3, 1987

[51] Int. Cl.⁴ .......................... B60R 1/04; B60R 1/08; G02B 7/18; G02B 5/08
[52] U.S. Cl. .................................. 350/626; 350/615; 248/484
[58] Field of Search .............. 350/615, 625, 626, 627, 350/616, 612, 632, 635; 248/481–484, 479, 476

[56] References Cited

U.S. PATENT DOCUMENTS

| | | | |
|---|---|---|---|
| 1,290,252 | 1/1919 | Lester et al. | 248/481 |
| 1,324,456 | 12/1919 | Lutz | 248/481 |
| 1,691,323 | 11/1928 | Zink | 248/481 |
| 1,972,246 | 9/1934 | Saver | 248/481 |
| 2,137,440 | 11/1938 | Boeve | 350/618 |
| 2,895,380 | 7/1959 | Kurlytis | 350/626 |
| 3,021,756 | 2/1962 | Milton et al. | 350/615 |
| 4,019,812 | 4/1977 | Carnine | 350/627 |

FOREIGN PATENT DOCUMENTS

| | | | |
|---|---|---|---|
| 585607 | 11/1958 | Italy | 350/626 |
| 998396 | 7/1965 | United Kingdom | 248/484 |

*Primary Examiner*—Jon W. Henry

[57] ABSTRACT

A full viewer is a kind of device, which comprises at least a mirror assembly, a support assembly and adjusting means to rotate said mirror assembly; said full viewer is to be installed inside a vehicle near the existing inside rearview mirror at the top middle of the windshield to provide the driver the ergonomics views in the directions of the rear left and the rear right portions, or the left hand and the right hand portions of said driver.

1 Claim, 3 Drawing Sheets

MIRROR ASSEMBLIES WITH UNIVERSAL JOINTS

BACKGROUND OF THE INVENTION

This invention relates to a device to be used inside a vehicle to increase the safety in driving. An existing inside rearview mirror located on the top middle of a windshield only allows a driver to see the view right behind. A second existing outside right hand mirror located on the right, front door allows the driver to see the view on the right hand side. However, it is too far away, not adjustable, and not easy to focus to take a quick glance. A third existing outside left hand mirror located on the left, front door allows the driver to see the view on the left hand side. Although it is rotatable it is not slideable. For a small driver whose seat is in a much forward position, a mirror that can not be slid forward can not provide the driver a better view. Besides, all mirrors outside the vehicle are subject to the affects of rain, dust and snow. To take a quick glance the driver needs to twist the head. In city traffic, having many vehicles and exit signs it is a panic to do so. Usually people take a first glance on the outside mirror to find if there is any vehicle and then, a second glance on the portion not covered by the outside mirror to make sure that it is safe to change lane. The motions are not ergonomics. This affects the driver not being able to concentrate on the fast changing situation in front of the driver's vehicle in order to slow down or even brake on any critical condition. Once in a while people change lanes without fully making sure that it is really clear because of the small gaps between vehicles and the short distance of the exit sign.

The full viewer can be placed on the top of the existing inside rearview mirror of the vehicle.

The principal object of this invention is to provide a device to allow the driver to see the views on the rear left and the rear right portions without twisting the driver's head. The driver will orient the driver's face to the center line of an angle between two lines of the driver's eyes to the full viewer, and the driver's eyes to the front. So the driver needs only to shift eyes to the full viewer to know the surrounding condition on the rear left or the rear right position to change lane. This is an ergonomics design.

A further consequence object of this invention is to provide the driver a constant alert and to eliminate the half-blind driving condition. Usually an alert of wide load truck behind or on the left lane or right lane is very important to avoid accidents. Once a while the driver pays less attention to the dead spots behind, especially the rear left portion.

A still further consequence object of this invention is to allow the driver only to shift eyes without twisting the head to see the view behind, or on the rear left or rear right portions; and quickly shift eyes back to concentrate in the front direction without panic to face the fast changing condition of busy traffic.

A final consequence object of this invention is to increase the safety of driving, relieve the driver's tension in city driving, increase driver's confidence, eliminate outside weather affects, provide ergonomics of viewing that fit drivers of different heights, and thus reduce accidents.

This invention is so simple, and yet so important and so effective that it is feasible to mandate its installation on all vehicles or newly manufactured vehicles.

DESCRIPTION OF THE DRAWING

The objects, characteristics and advantages of this invention will be more fully understood from the accompanying drawings, in which.

DESCRIPTION OF THE INVENTION

Figure 1:
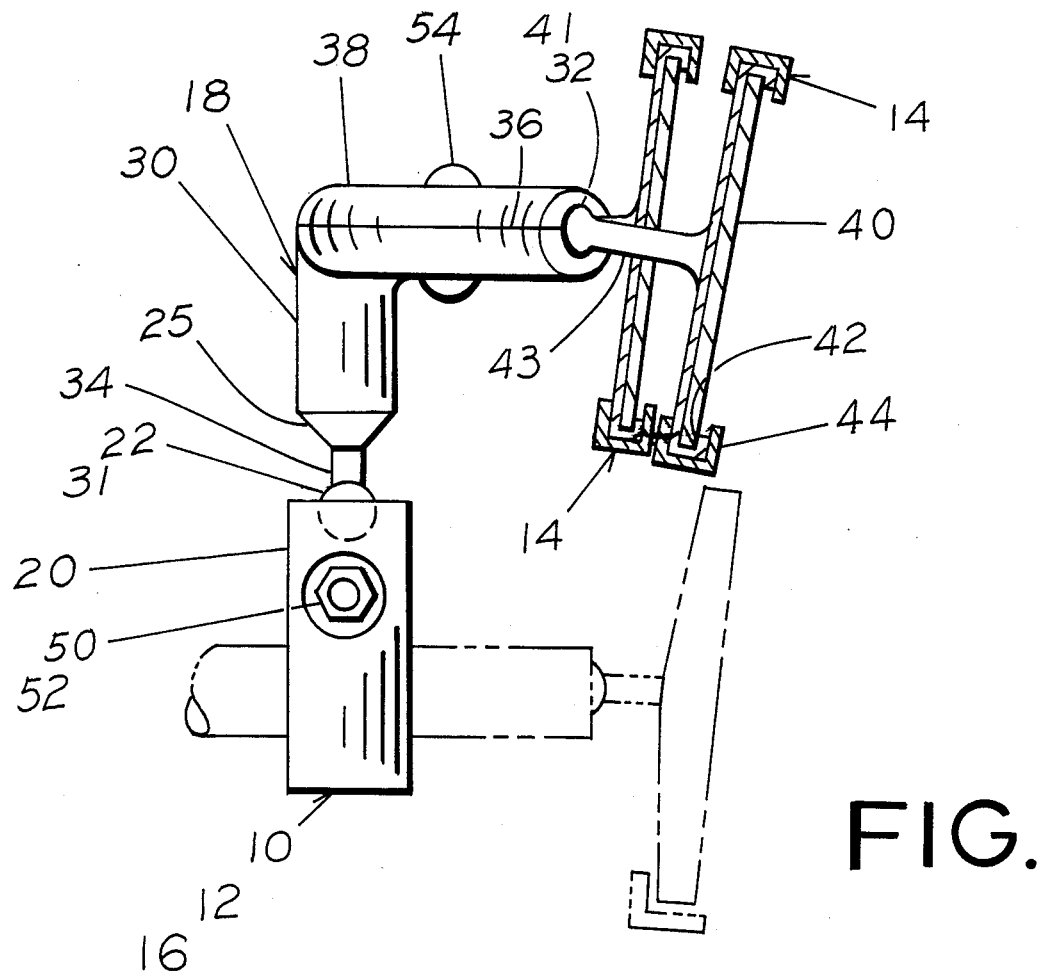
FIG. 1 is a side view of the most preferred embodiment.

Now, referring to FIG. 1, there is shown a side view of a full viewer 10. It consists of a support assembly 12 and two mirror assemblies 14. The support assembly 12 consists of a lower support assembly 16 and an upper support assembly 18. The upper support assembly 18 is adjustable at an universal joint 31. The mirror assemblies 14 are adjustable at universal joints 41. The support assembly 12 will be mounted on the existing tubing of the inside rearview mirror of the vehicle as shown by phantom lines, or be mounted the like for mirror attached onto the ceiling. Each mirror assembly 14 has a mirror 40, back cover 42 with a support 43 and an universal joint 41, and a protecting trim 44. Each mirror assembly 14 may include a lever and a feature to reduce glare from the headlights of vehicles behind, which are not shown for the purpose of clarity.

The lower support assembly 16 consists of two clamp-halves 20 assembled together by a screw 50 and a self-locking nut 52. Both clamp-halves 20 form a spherical cavity 22 to hold the universal joint 31.

The upper support assembly 18 consists of a lower stem-half 30 and an upper stem-half 38, which are assembled together by two rivets or fasteners 54. The lower stem-half 30 has an universal joint 31 with a stem 34 at the lower end, a chamfer 25 to meet a column 30 of larger diameter, and an arc 36 at the top. The upper stem-half 38 and the lower stem-half 30 form spherical cavity 32 at each end to hold the universal joint 41.

The mirror assemblies 14 may have different sizes. The support assembly 12 may be simplified and mounted directly onto the windshield or the ceiling of the vehicle. The preferred embodiment shown is convenient for the vehicle owners to install the full viewers 10 by themselves. The two mirror assemblies 14 may be combined into one mirror assembly with an adjusting hinge at the middle. Also, the two mirror assemblies 14 may be combined into one mirror assembly of flat piece to cover the view of the rear left, and the left side of the rear portion; and have the existing inside rearview mirror covers the view of the rear right, and the right side of the rear portion.

Figure 2:
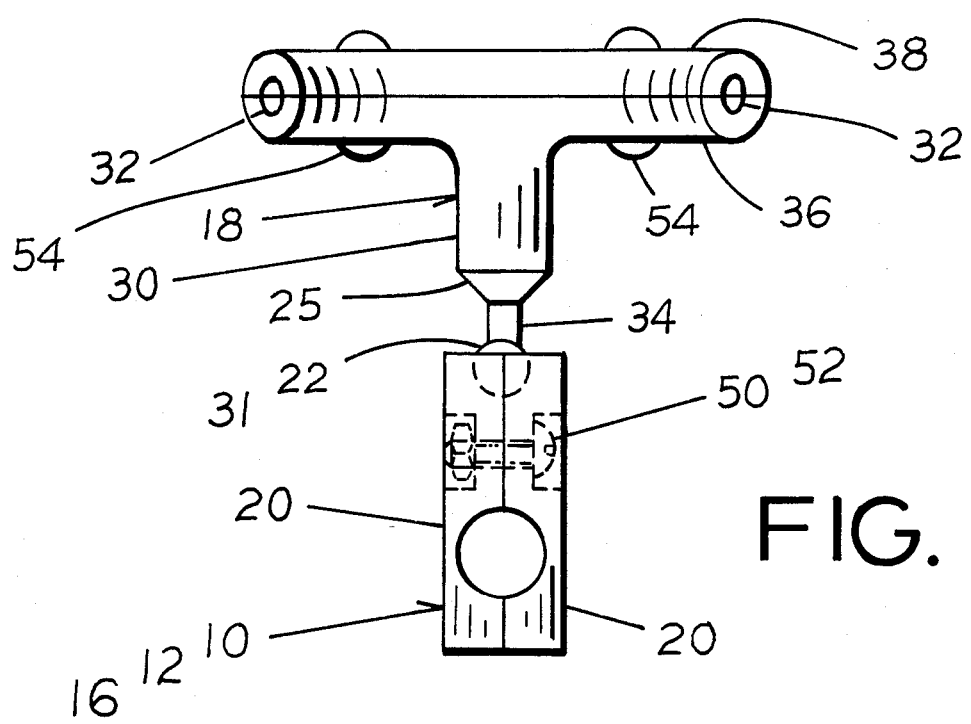
FIG. 2 is a rear view of the FIG. 1.

FIG. 2 shows details of the support assembly 12 of full viewer 10 without the mirror assemblies 14 for the purpose of clarity. Again, those items have the same functions as items described above in the FIG. 1. The universal joint may be held by a swaged tubing end.

Figure 3:
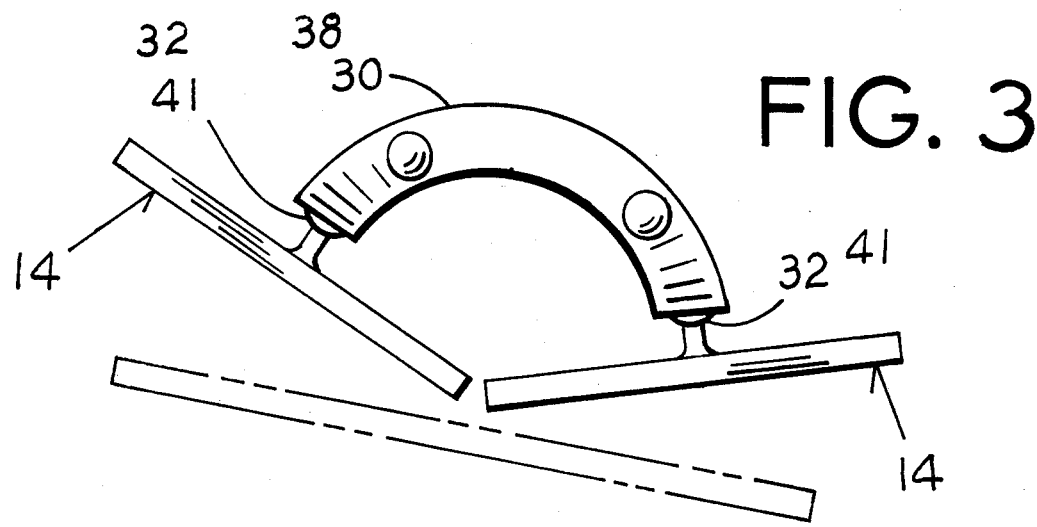
FIG. 3 is a top view of the FIG. 2.

FIG. 3 shows two mirror assemblies 14 and the existing inside rearview mirror in phantom lines. The universal joint 41 on the end of each mirror assembly 14 is connected to the cavity 32 formed by the lower stem-half 30 and the upper stem-half 38.

Figure 4:
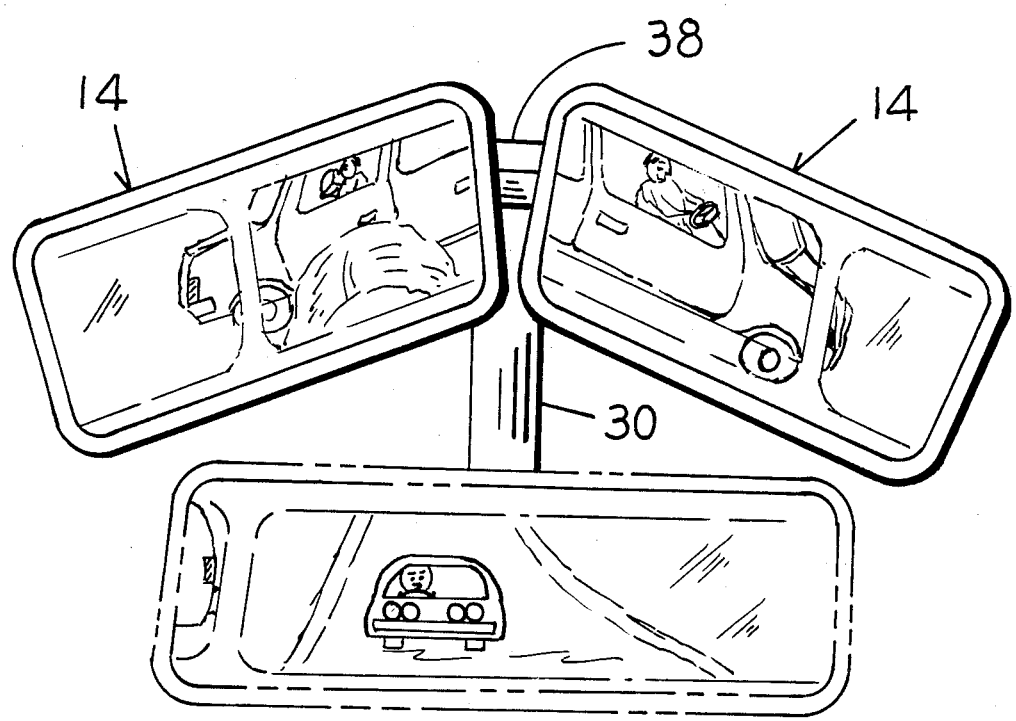
FIG. 4 is a driver's view of the traffic conditions behind and on the rear left and rear right portions.

FIG. 4 shows a driver's view as the driver takes a look inside the vehicle. The mirror assemblies 14 are supported by the lower stem-half 30 and the upper stem-half 38. The existing inside rearview mirror of the vehicle covers the view of the rear portion. While the mirror assemblies 14 on the upper left and the upper right portions cover views of other vehicles on the driver's left lane and right lane, respectively. The two mirror assemblies 14 may be mounted below the existing inside rearview mirror by a clip type support or the like. The mirror assemblies 14 may be simplified or added with an anti-glare device to avoid headlights of vehicles on the driver's both sides. However, the intensity of the said headlights is much less because the lights hit the mirror assemblies 14 at an angle other than a normal angle. Also, the two mirror assemblies 14 and the existing inside rearview mirror on the vehicle may be combined into one mirror assembly having an upside-down U-shaped portion cut out from a cylindrical or spherical surface. The mirror assembly 14 at the right hand side may be rotated to see the view on the left hand side of the driver, and the mirror assembly 14 at the left hand side be rotated to see the view on the right hand side.

The descriptions and illustrations of this invention mentioned above are those of the most preferred embodiments and no unnecessary limitations should be understood therefrom as modification will be obvious to those skilled in the art.

I claim:

1. A vehicle side viewer to be installed inside a vehicle comprising, two mirror assemblies, a support assembly and adjusting means to rotate each of said mirror assemblies to enable a vehicle driver to see the views in the directions of the rear left and the rear right portions, or in the directions of the left hand and the right hand portions of said driver;

said support assembly comprising a lower support assembly and an upper support assembly;

said lower support assembly having two clamp-halves assembled together by a fastener and a self-locking nut;

said upper support assembly having a lower stem-half and an upper stem-half assembled together by fasteners; said lower stem-half having an universal joint at the lower end, a chamfer to meet a column of larger diameter, and an arc at the top;

said two clamp-halves on said lower support assembly forming a spherical cavity to hold said universal joint on said upper support assembly; and said lower stem-half and said upper stem-half on said upper support assembly forming a spherical cavity to hold said universal joint on each of said mirror assemblies.

* * * * *